United States Patent [19]

Veerhusen et al.

[11] Patent Number: 4,805,396
[45] Date of Patent: Feb. 21, 1989

[54] AUTOMATIC FUEL CONTROL AND ENGINE SYNCHRONIZER SYSTEM AND APPARATUS

[75] Inventors: Dan S. Veerhusen; David C. Pattison, both of Cedar Rapids, Iowa

[73] Assignee: Rockwell International Corporation, El Segundo, Calif.

[21] Appl. No.: 915,167

[22] Filed: Oct. 3, 1986

[51] Int. Cl.⁴ .............................................. F02C 6/00
[52] U.S. Cl. ................................... 60/39.15; 60/719; 74/480 R
[58] Field of Search .................. 60/39.15, 39.281, 719; 74/479, 480 R, 483 R, 491, 501 R; 244/76 R, 182, 188, 196

[56] References Cited

U.S. PATENT DOCUMENTS

| | | | |
|---|---|---|---|
| 2,625,834 | 1/1953 | Jorgensen et al. | 60/719 |
| 2,881,635 | 4/1959 | Greene | 74/480 |
| 3,199,811 | 8/1965 | Darby et al. | 244/76 R |
| 3,424,024 | 1/1969 | Derbfuss | 74/480 |
| 3,839,860 | 10/1974 | Martin | 60/39.15 |
| 4,567,786 | 2/1986 | Sakurai | 60/39.281 |
| 4,641,268 | 2/1987 | Zweifel et al. | 244/182 |
| 4,651,954 | 3/1987 | Miller | 74/491 |

*Primary Examiner*—Louis J. Casaregola
*Attorney, Agent, or Firm*—Gregory G. Williams; M. Lee Murrah; H. Fredrick Hamann

[57] ABSTRACT

A first computer and a first servo with connecting apparatus are used to drive a first engine throttle. A second servo and a second computer together with second connecting means are used to drive a second engine throttle. In addition, a cross connection capstan, cable, pulley and electrically clutched capstan are used to selectively connect the two engine throttles, thereby allowing for the operation and regulation of both engine throttles by either the first servo/computer combination or the second servo/computer combination.

5 Claims, 2 Drawing Sheets

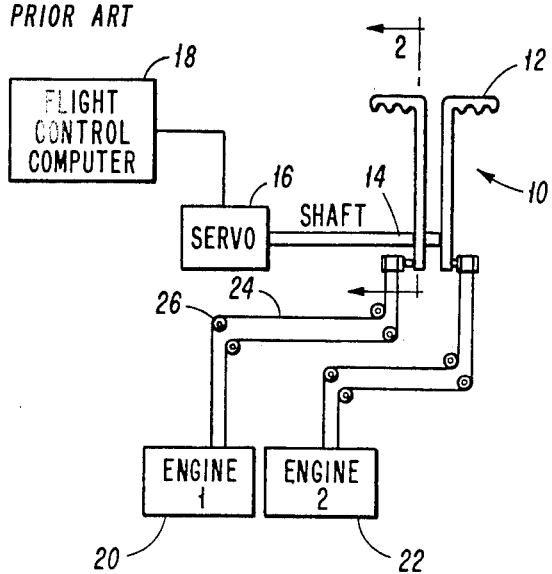
FIG 1
PRIOR ART
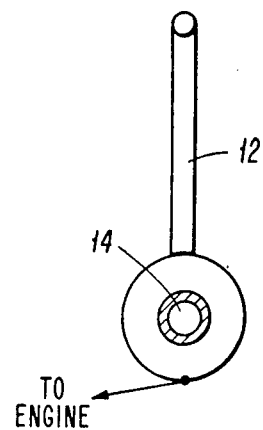
FIG 2
PRIOR ART
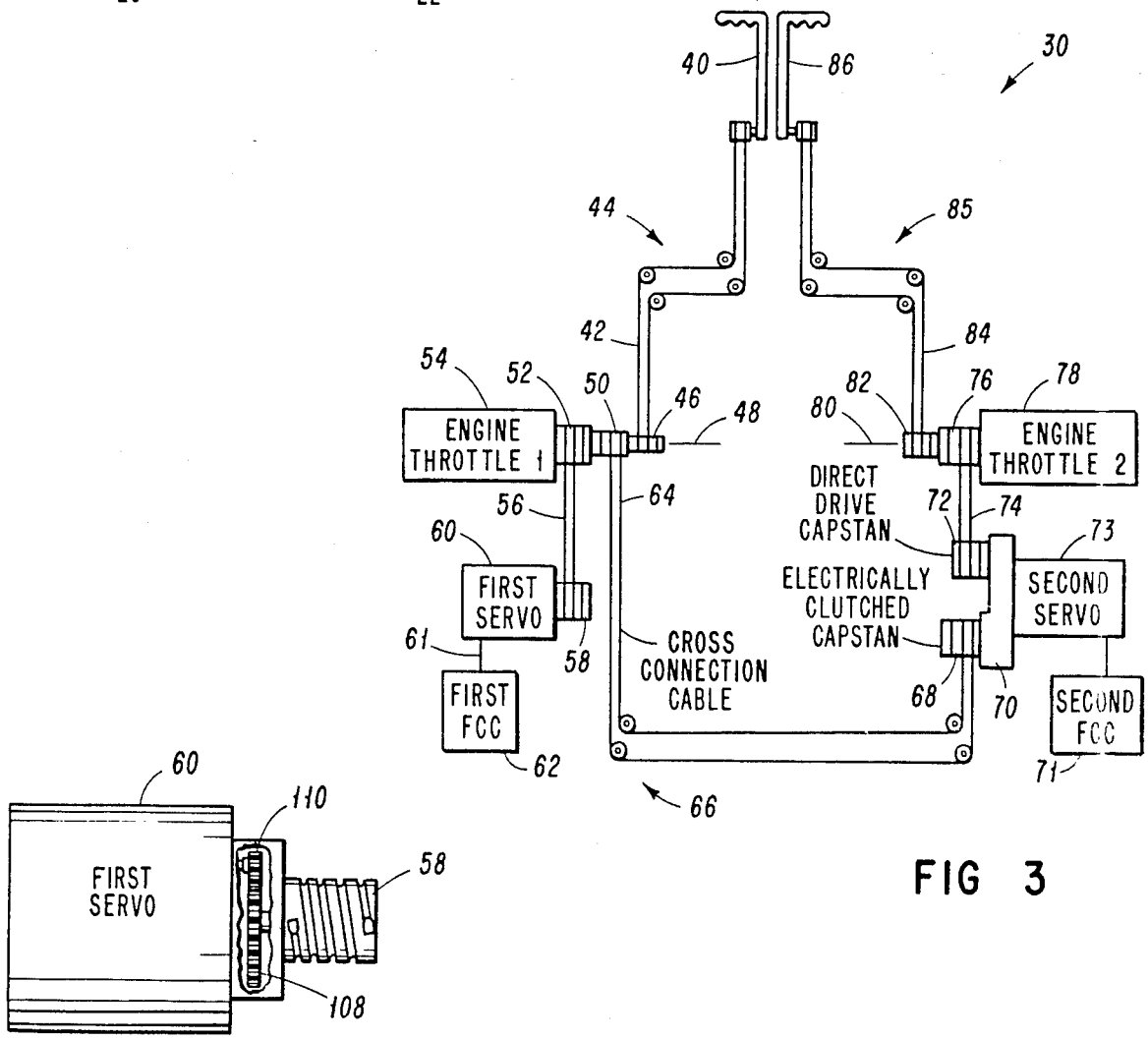
FIG 3
FIG 5

AUTOMATIC FUEL CONTROL AND ENGINE SYNCHRONIZER SYSTEM AND APPARATUS

BACKGROUND OF THE INVENTION

The present invention generally relates to aircraft engine fuel control systems, and more particularly is concerned with automatic throttle and synchronization systems for multi-engine aircraft.

In recent years, the cockpits of modern multi-engine aircraft have become increasingly crowded with complex avionics equipment, which provides the flight crew with much-needed information, while concomitantly requiring increased crew attention. Consequently, it is quite beneficial to provide automatic control systems for relieving some of the pilot's many in-flight tasks. Autothrottles and electronic synchronizers, which manage the engine thrust by controlling the fuel supplied to the engines, are typically some of these automatic systems.

In multi-engine aircraft it is often desirable to have independent fuel controls over the several engines so as to enable the pilot or a flight control computer to effectively match the thrust and frequencies of the engines, thereby regulating the speed and attitude of the aircraft and also abating the ubiqitous beat frequencies which often perturb the passengers. Another concern in modern aircraft design, which reflects the current heightened attention to air travel safety, is to provide ultra-highly reliable mechanical systems throughout the aircraft.

One type of autothrottle system which has been frequently used in the past, basically provides a computer controlled servo unit connected to and mechanically manipulating the throttle control handles which are located at the pilot's side. The servo unit is usually connected to the throttle handles, as a unit, so that when the servo operates the handles track together, i.e., each is moved the same amount. These throttle control handles are typically connected to the engines by elongated cables, so that when the throttle control handles are moved, either by the pilot or by the servo, the cables and their throttle connections at the engine are also moved. This movement results in the regulation of fuel to the engines.

While this system, or variations or it, have been extensively used for automatically controling the engine thrust, it does have numerous serious drawbacks. The throttle controls and the elongated cables are typically connected to the servo by a common shaft; this configuration does not enable automatically controlling the separate engine fuel supplies on an independent basis. Therefore, the fine tuning or matching of the engine speeds is not fulfilled by the autothrottle systems. Rather, it is either left as a pilot duty or is controlled by a separate and expensive on-board electronic engine control system. Furthermore, due to the conventional reluctance of design engineers to double the weight of an autothrottle system by adding a symmetrically redundant automatic back-up system. The duty to regulate engine thrust and engine fuel is typically returned to the pilot in the event of an autothrottle system failure. Moreover, typical system designs have an additional undesirable drawback; the elongated cables extending from the servo aft to the engines experience considerable stretching, thereby causing "play" or "dead zones" to appear in the throttle control system. These dead zones traditionally have caused limit cycles of several knots when the throttle controls aircraft speed.

During the protracted and expensive experimentation leading up to this invention, numerous designs were attempted, each of which was thought to be inferior in some regard. For example, is meeting the independent engine control requirement it was thought to provide a separate primary autothrottle system, i.e., a flight control computer system, servo and connecting cables etc., for each engine. It was then thought that the "dead zones" could be reduced in such a system by positioning the servo units closer to the engine and thereby reducing the cable length and corresponding cable stretch. These solutions were unattrative when the system was also required to have a back-up or redundant system. If each engine had its own primary autothrottle and a redundant system to take over if a primary servo or computer failed, it was clear that the need to two servos and two computers for each engine may be uneconomical and also would likely create serious weight considerations in multi-engine aircraft, especially those with rear-mounted engines where the added weight might adversely change the critical position of the plane's center of gravity.

Consequently, a great need exists for improvement in autothrottle control and synchronizer systems which provide for independent fuel control for each of the several engines, a reduction in the "play" or "dead zones", and a redundant automatic back-up system without doubling the weight of the autothrottle and synchronizer systems.

It is an object of this invention to provide an autothrottle and synchronizer system which independently controls several engines of a multi-engine aircraft while concurrently providing a back-up system in the event of a primary system failure.

It is a feature of this invention to have a selectable cross-connection between the primary throttle control servos of two engines so that if either one of the primary servos or computers fails, the primary servo and computer of the other engine, together with the selectable cross-connection, will operate the throttle which was serviced by the failed component.

It is an advantage of this invention to enable a reduction in the cost and weight of a redundant autothrottle and synchronizer system in that the need for four servos, two computers and two electronic engine synchronizers to operate a complete primary and redundant system for two engines is reduced to two servos and two computers along with a selectable cross-connection and no electronic engine synchronizers.

SUMMARY OF THE INVENTION

The present invention provides an automatic engine fuel control system designed to satisfy the aforementioned objects, contain the above-described features, and produce the previously-stated advantages. The engine fuel is independently controlled by separate automatic fuel controls for each engine with the servo units mounted near the engines they control. Instead of providing a symmetrical system for redundancy, an asymmetrical configuration is used whereby, with the aid of a selectable cross-connector, a primary servo and computer of one engine serves to provide a back-up for a failed primary servo or computer of another engine. Since the asymmetrical configuration eliminates the need for an additional servo and computer for each engine, there is an overall reduction in system cost and weight.

Furthermore, the present invention eliminates the need for electronic engine controls because of the features of the highly responsive selectable cross connection and independent servos located near each engine, which reduce the connecting cables lengths and therefore cable stretch, thereby increasing the responsiveness of the autothrottle system to such a degree as to allow for fine-tuning of the engine frequencies.

Accordingly, the present invention relates to an apparatus and system for controlling the fuel supply to aircraft engines comprising a first engine fuel control system, a second engine fuel control system and a selectable cross connection between the first and second engine fuel control system.

BRIEF DESCRIPTION OF THE DRAWINGS

FIG. 1 is a schematic representation of a typical automatic fuel control apparatus that is in the prior art.

FIG. 2 is a cross-sectional view taken along line 2—2 of FIG. 1 of the prior art.

FIG. 3 is a schematic representation of the present invention and a typical environment.

FIG. 5 is a partial-cut-away view of the single capstan device of FIG. 3.

DESCRIPTION OF PREFERRED EMBODIMENTS

Figure 4:
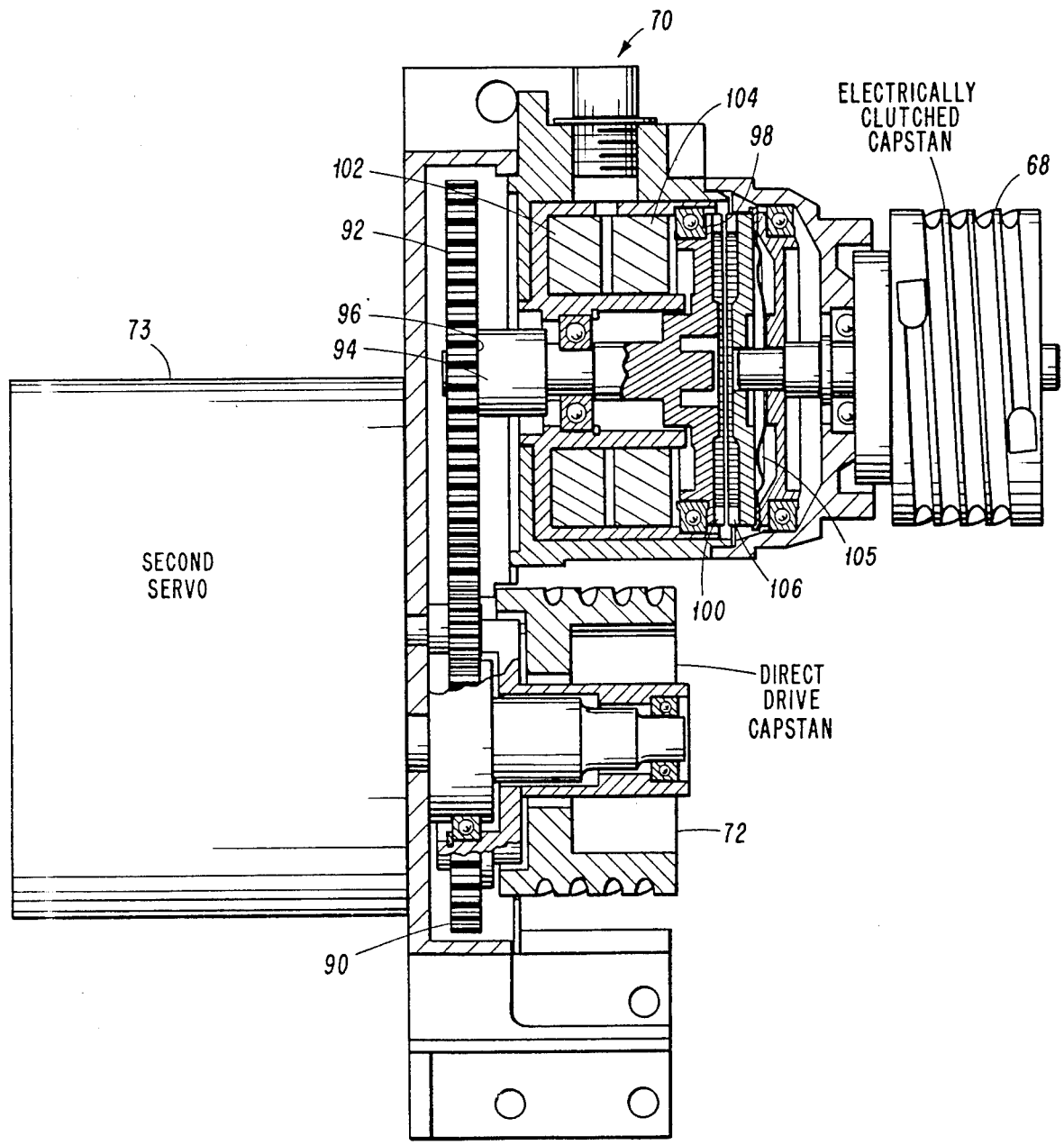
FIG. 4 is a cut-away view of the clutched gear assemlby of FIG. 3.

Referring now to the drawings, and more particularly to FIG. 1, there is schematically shown an apparatus, generally designated 10, for automatically controlling aircraft throttles, which is typical of the prior art. Apparatus 10 basically includes several throttle control handles 12, a rotatable shaft 14 connecting throttle handles 12, a servo unit 16 for rotating the shaft as controlled by flight control computer 18. Throttle handles 12 are typically connected to aircraft engines 20 and 22 by elongated cables 24 which are guided by pulleys 26. Typically, a flight control computer 18 controls a servo 16 which selectively rotates a shaft 14 which is thereby connected to throttle handles 12 causing them to pivot and move elongated cables 24 through pulleys 26 and back to engines 20 and 22, thereby regulating the engine throttles. In this design, throttle handles 12 and cables 24 move together, without automatic differentiation between the throttle handles and the separate cables because handles 12 are attached to one rotating shaft 14. Furthermore there is no backup or redundant system in such a design. Morever, the autothrottle of this prior art design cannot be used to match the engine frequencies.

The engagement of the prior art throttle handles 12 with the prior art shaft 14 is illustrated in FIG. 2, in which is shown a cross-sectional view taken along line 2—2 of FIG. 1.

The preferred embodiment of the invention is shown in FIG. 3. In FIG. 3, there is schematically shown an apparatus, generally designated 30, for automatically and independently controlling the throttles of two aircraft engines. Apparatus 30 basically includes a first throttle lever 40, which is typically located in the cockpit at the pilot's side. This lever 40 is typically an L- or similar- shaped rigid member having a grip or handle for the pilot to grasp, but is used to manipulate a first elongated cable set 42, which extends from lever 40 through a first pulley system 44 and connects with a first engine throttle capstan 46. Cable set 42 may be a single endless looped cable or may be broken into two separate cables, each connected at both ends to a capstan or throttle lever. Cables 42 are typically metallic cables, or the like, commonly used in aircraft throttle systems. Pulleys 44 are shown as four pulleys, two for each cable, but any suitable combination of pulleys or guiding means may be substituted. The combination shown is merely illustrative and variations peculiar to the needs of a particular aircraft are expected.

First elongated cable capstan 46, which receives and is rotated by cable set 42, is of the type commonly used in aircraft autothrottle design. Aluminum is the preferred material for the capstan 46, but any suitable material may also be used. Capstan 46 is rotated about an axis 48 and is engaged with a first cross connection capstan 50, of similar design and which also rotates about axis 48. Capstan 50 is engaged with first interior capstan 52 which engages an engine throttle 54 and rotates about axix 48. Capstans 46, 50, an 52 are coupled so that they all rotate together.

The first interior capstan 52 receives a first servo cable set 56, which rotatably connects to first single capstan 58 which engages a first servo 60. First servo 60 is controlled by a first flight control computer 62 with connecting line 61, which selectively causes first servo 60 to rotate first single capstan 58, thereby rotating first servo cable set 56 and causing first interior capstan 52 to rotate first engine throttle 54. First cross connection capstan 50 receives a set of cross connecting cables 64 which extend through a cross connecting pulley system 66 and engage an electrically clutched capstan 68 which is selectively connected by an electrically clutched gear assembly 70 to a direct drive capstan 72. The pulley system 66 is shown as four pulleys, two for each cable, but any suitable combination of pulleys or guiding means may be substituted. The combination shown is merely illustrative and variations peculiar to the needs of a particular aircraft are expected. Capstan 72 receives a second servo cable set 74, extending to a second interior capstan 76 which engages second engine throttle 78 and is rotatable around an axis 80 and engages a second engine throttle 78. Capstan 76 also engages a second elongated cable capstan 82 which receives a second elongated cable set 84, which extends through pulley system 85, which is similar to pulleys 44, and terminates with second throttle control lever 86.

Cable sets 42 and 84 together with servo cable sets 56 and 74, and cross connecting cables 64 are preferably three thirty-seconds inch steel cable, but chains, ropes, belts or any suitable elongated flexible connector may be substituted. The cables are preferably endless and may be looped around the capstans, but any configuration of elongated members and connectors may be substituted. Capstans 46, 50, 52, 58, 68, 72, 76 and 82 are similar to those already known in the art. These capstans could be replaced by sprockets, gears, pulleys or any suitable devices which are capable of receiving a movable member.

Now referring to FIG. 4, there is shown an electrically clutched gear assembly 70 with a second servo 73. Gear assembly 70 is used to selectively engage capstan 68 and capstan 72 in such a manner as to produce a nearly equal rotational displacement in one capstan when the other capstan is rotationally displaced. Basically, gear assembly 70 operates as follows: capstan 68 is rotated by cables 64 while capstan 72 is rotated by a second servo 73, which gear assembly 70 is designed to selectively transfer the slight rotations of one capstan to the other.

The selectability aspect of the invention is a result of an electrically operates clutch mechanism. Capstan 68 is engaged with clutch gear 106 so that they rotate together. Gear 106 is a fine toothed gear of a durable alloy, preferably a magnetic iron. Gear 106 is designed to mesh with another similar finely toothed gear 100 in such a manner as to reduce the "slippage" between gears 100 and 106 when they are meshed and rotated. One alternative to the gear 100 and 106 combination is to substitute friction pads for gears to allow more resolution or positions of engagement and disengagement of the clutch assembly. Gear 106, whether it is a finely toothed gear or friction pad, is capable of translational motion in a direction perpendicular to the plane of interface between gears 100 and 106. This translational motion is selectively controlled by a computer-generated electrical signal from either first flight control computer (FCC) 62 or second FCC 71. The selective translation is achieved by attaching gear 106 to a reversed biased spring diaphragm 105 which is indirectly engaged with capstan 68.

When electromagnetic coils 102 and 104 are connected to a current source, a magnetic field is produced, thereby causing gear 106 to move toward gear 100. When insufficient or no current flows through the winding of the coils 102 and 104, gear 106 is pulled out of engagement with gear 100 by reverse biased spring 105. Gear 100 is connected to a shaft 94. Preferably, shaft 94 is a non-magnetic stainless steel and connects to a constant meshing gear 92, which is in continuous engagement with direct driven gear 90, which is driven by servo 73. Capstan 72 is engaged with gear 90 so that if gear 90 is rotated, capstan 68 is also rotated by a nearly equal amount.

Now referring to FIG. 5, there is shown a cut-away view of capstan 58 and first servo 60. There is also known a first servo receiving gear 108 and a first servo driving gear 110. First servo 60 selectively drives first servo driving gear 110 which engages first servo receiving gear 108 and thereby drives capstan 58.

In operation, the autothrottle system of this invention provides for independent automatic computer operates throttle controls. Where first flight control computer 62 selectively operates first servo 60 thereby rotating capstan 58 and capstan 52 with cable 56 therebetween. Thereby, engine throttle control 54 is caused to be manipulated selectively by computer 62. When cables 56 rotate capstan 52, capstans 50 and 46 are also caused to rotate about axis 48. Cables 42 are moved by capstan 46, and thereby manipulating first throttle lever 40. Also, while engine throttle 54 is being manipulated, first cross connection capstan 50 which its cross connecting cables 64 are caused to rotate. Cables 64 connect with electrically clutched capstan 68. Therefore, when computer 62 drives throttle 54, the capstan 68 is also caused to be rotated. Capstan 68 is selectively connected to capstan 72. Normally, when there are no system failures, capstan 68 is not in engagement with capstan 72.

If second flight control computer 71 and second servo 73 are functioning properly, direct drive capstan 72 is selectively rotated in response to commands from computer 71, thereby with the aid of cables 74, rotating capstan 76. When capstan 76 is rotated, second engine throttle 78 and second elongated cable capstan 82 are also rotated, which causes the second elongated cables 89 to move thereby manipulating the lever 86.

In the event of a computer 71 or servo 73 failure, the operation of the system of this invention is changed. In such cases, electric coils 102 or 104 are energized, thereby engaging gears 100 and 106. This gear engagement causes capstan 68 to be engaged with capstan 72. Therefore, capstan 68, which is rotated in response to computer 62, causes capstan 72 to rotate, thereby regulating engine throttle 78. This arrangement provides a back-up or redundant system in the vent either servo 73 or computer 71 fails.

The system of this invention also provides a back-up or redundant system in the event that first servo 60 or first flight control computer 62 fails. In such situations, gears 100 and 106 are caused to be engaged so that when servo 73 drives capstan 72 capstan 68 it also roated. Rotating capstan 68 causes capstan 50 to rotate, which is indirectly engaged to first engine throttle 54. Therefore, if either servo 60 or computer 62 fail, servo 73 and computer 71 are capable of driving both throttle 78 and throttle 54. Likewise, if servo 73 or computer 71 fail, servo 60 and computer 62 are capable of controlling both throttles 54 and 78.

The invention above-described is not limited to propeller or jet aircraft; moveover, it can be equally applied in non-aviation environments, such as, but not limited to, trucks, commuter transports, etc.

It is thought tha the automatic throttle control and synchronizer system of this invention and many of its attendant advantages will be understood from the foregoing description, and it will be apparent that various changes may be made in the form, construction and arrangement of the parts thereof without departing from the spirit and scope of the invention, or sacrificing all of its material advantages, the form hereinbefore described being merely a preferred of exemplary embodiment thereof.

We claim:

1. An automatic, independent, redundant, and computer controlled engine fuel control system for aircraft of the type having at least a first engine having a first engine throttle and a second engine having a second engine throttle, comprising in operative combination:
    a. a first flight computer controlled servo;
    b. a rotatable capstan attached to said first servo;
    c. a cable extending from said rotatable capstan to the first engine throttle;
    d. a second flight computer controlled servo;
    e. a second rotatable capstan attached to the second servo;
    f. a cable extending from said second rotatable capstan to the second engine throttle;
    g. a selecting clutch attached to the second engine throttle; and
    h. an elongated connecting member extending from the first engine throttle to the selective clutch, whereby the first throttle with the attached elongated connecting member is selectively clutched and is capable of being engaged or disengaged with the second engine throttle by the selective clutch.

2. An automatic throttle system for machines having a first engine and a a second engine, comprising in operative combination:
    a. a first servo;
    b. means for generating and transmitting a control signal to said first servo;
    c. a first servo capstan in rotational engagement with said first servo;

d. a first connecting cable for connecting said first servo capstan and the first engine;
e. a second servo;
f. means for generating and transmitting a control signal to said second servo;
g. a second servo capstan in rotational engagement with said second servo;
h. a second connecting cable for connecting said second servo capstan and the second engine;
i. a third capstan;
j. a clutch attached between said capstan and said second capstan;
k. means for connecting said third capstan and said first capstan; whereby the first servo is selectable connected to the second servo.

3. A system as described in claim 2 wherein the means for connecting said third capstan and said first capstan further comprises:
   a. a plurality of cable guides; and
   b. a plurality of cables, each connected at one end to said third capstan and extendind through said cable guides, each being connected at its other end to said first capstan.

4. A system for controlling a first engine throttle and a second engine throttle, comprising an operative combination:
   a. a first flight computer controlled servo;
   b. a rotatable capstan attached to said first servo;
   c. a cable extending from said rotatable capstan to the first engine throttle;
   d. a second flight computer controlled servo;
   e. a seocnd rotatable capstan attached to the second servo;
   f. a cable extending from said second rotatable capstan to the second engine throttle;
   g. a selective clutch attached to the second engine throttle; and
   h. an elongated connecting member extending from the first engine throttle to the selective clutch, whereby the first throttle with the attached elongated connecting member is selectively clutched and is capable of being engaged or disengaged with the second engine throttle by the selective clutch.

5. An automatic, independent, redundant, and computer controlled engine fuel system for aircraft of the type having at least a first engine having a first engine throttle and a second engine having a second engine throttle, comprising in operative combination:
   a. a first computer controlled servo;
   b. a first servo capstan rotatably engaged with the first servo;
   c. a first interior capstan engaging the first engine throttle;
   d. a first servo cable extending from the first servo capstan and the first interior capstan, so that a rotation in the first servo capstan is transferred to a rotation in the first interior capstan;
   e. a first cross connecting capstan engaged with the first interior capstan, so that when the first interior capstan is rotated the first cross connecting capstan is also rotated;
   f. an electrically clutched capstan;
   g. a cable extending from the first cross connecting capstan to the electrically clutched capstan so that when the first cross connecting capstan is rotated the electrically clutched capstan is also rotated;
   h. a direct drive capstan;
   i. an electrical clutch means engaging the electrically clutched capstan and engaging the direct drive capstan, so that the clutched capstan and the drive capstan are selectively capable of engagement and disengagement,
   j. a second computer controlled servo engaging the drive capstan;
   k. a second interior capstan engaged with the second engine throttle;
   l. a second servo cable extending from the drive capstan to the second interior capstan, so that when the drive capstan is rotated, the second interior capstan is also rotated;
   whereby in normal operation the first servo operates the first engine throttle while the second servo operates the second engine throttle, and in the event of a failure of either servo to properly drive its respective engine, the selective clutch is engaged and thereby both the first engine throttle and the second engine throttle can be manipulated by the remaining functional servo.

* * * * *